(12) United States Patent
Kim et al.

(10) Patent No.: US 11,150,080 B2
(45) Date of Patent: Oct. 19, 2021

(54) THICKNESS MEASUREMENT APPARATUS, THICKNESS MEASUREMENT METHOD, AND THICKNESS MEASUREMENT PROGRAM

(71) Applicant: IUCF-HYU (INDUSTRY-UNIVERSITY COOPERATION FOUNDATION HANYANG UNIVERSITY), Seoul (KR)

(72) Inventors: Hak-Sung Kim, Seoul (KR); Gyung Hwan Oh, Seoul (KR); Deok Joong Kim, Seoul (KR); Dong Woon Park, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 84 days.

(21) Appl. No.: 16/499,667

(22) PCT Filed: Mar. 30, 2018

(86) PCT No.: PCT/KR2018/003783
§ 371 (c)(1),
(2) Date: Sep. 30, 2019

(87) PCT Pub. No.: WO2018/182360
PCT Pub. Date: Oct. 4, 2018

(65) Prior Publication Data
US 2020/0116473 A1 Apr. 16, 2020

(30) Foreign Application Priority Data

Mar. 30, 2017 (KR) .......................... 10-2017-0040887
Jun. 16, 2017 (KR) .......................... 10-2017-0076746

(51) Int. Cl.
*G01B 11/06* (2006.01)

(52) U.S. Cl.
CPC .................................... *G01B 11/06* (2013.01)

(58) Field of Classification Search
CPC ...................................................... G01B 11/06
See application file for complete search history.

(56) References Cited

U.S. PATENT DOCUMENTS

2013/0204577 A1* 8/2013 Savard .................. G01N 21/86
702/172
2017/0003116 A1* 1/2017 Yee .......................... G01S 17/34

FOREIGN PATENT DOCUMENTS

CN 102272578 A 12/2011
CN 104061958 A 9/2014
(Continued)

OTHER PUBLICATIONS

Communication dated Sep. 29, 2020 by the National Intellectual Property Administration of China in application No. 201880023362.9.

(Continued)

*Primary Examiner* — David P Porta
*Assistant Examiner* — Fani Boosalis
(74) *Attorney, Agent, or Firm* — Sughrue Mion, PLLC

(57) ABSTRACT

A thickness measuring device is provided. The thickness measuring device may include a terahertz wave signal processing unit configured to receive a terahertz wave according to at least one mode of a reflection mode and a transmission mode, a refractive index information acquisition unit configured to acquire refractive index information of the thickness measurement sample in consideration of second-time difference information between a first reflected terahertz wave and a second reflected terahertz wave, and a thickness information acquisition unit configured to acquire (Continued)

thickness information of the thickness measurement sample in consideration of the refractive index information.

17 Claims, 12 Drawing Sheets

(56) References Cited

FOREIGN PATENT DOCUMENTS

| | | |
|---|---|---|
| CN | 104169677 A | 11/2014 |
| CN | 105403178 A | 3/2016 |
| JP | 2009-186333 A | 8/2009 |
| JP | 2015-508160 A | 3/2015 |
| JP | 2015-143666 A | 8/2015 |
| JP | 2017-15681 A | 1/2017 |
| KR | 10-1621366 B1 | 5/2016 |
| KR | 10-2017-0003086 A | 1/2017 |

OTHER PUBLICATIONS

International Search Report for PCT/KR2018/003783 dated Aug. 10, 2018 [PCT/ISA/210].
Office Action of CN Patent Application No. 201880023362.9 along with its translation, dated Apr. 15, 2021.
Li Li et al. "Test of the adhesive thickness uniformity based on terahertz time-domain spectroscopy" vol. 44, No. 7 China Academic Journal.
Office Action dated Jun. 18, 2021 in Korean Application No. 10-2017-0076746.

* cited by examiner

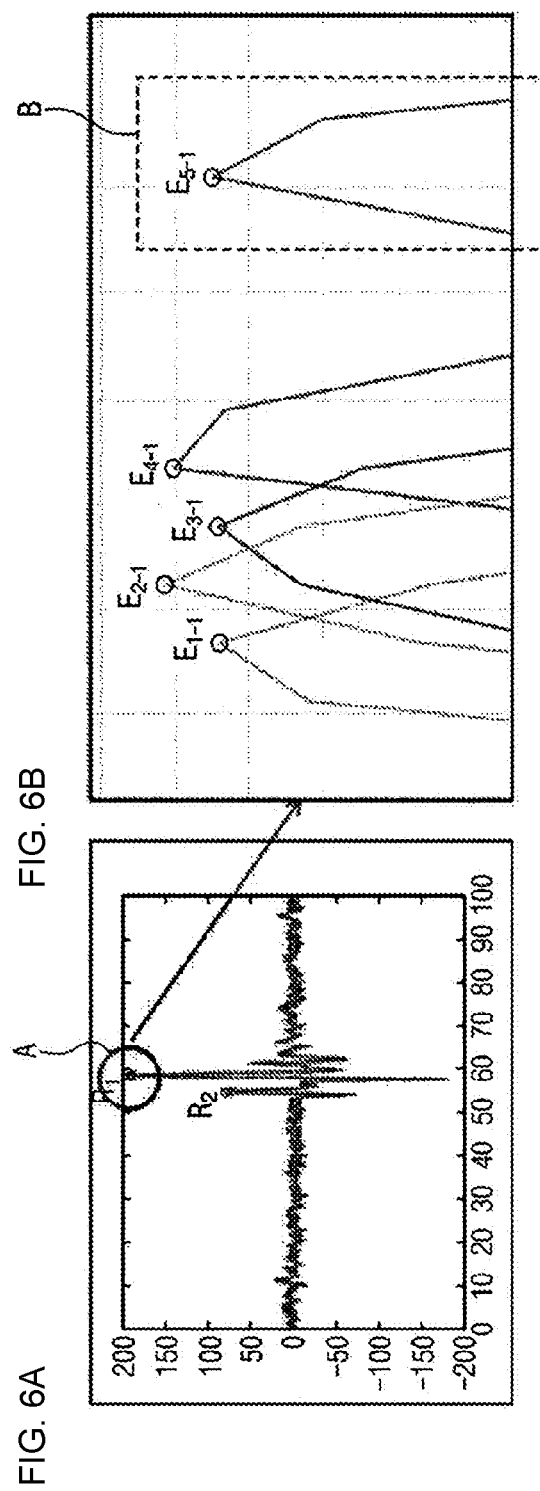

THICKNESS MEASUREMENT APPARATUS, THICKNESS MEASUREMENT METHOD, AND THICKNESS MEASUREMENT PROGRAM

CROSS REFERENCE TO RELATED APPLICATIONS

This application is a National Stage of International Application No. PCT/KR2018/003783, filed on Mar. 30, 2018, which claims priority from Korean Patent Application No. 10-2017-0040887, filed on Mar. 30, 2017, and Korean Patent Application No. 10-2017-0076746, filed on Jun. 16, 2017.

TECHNICAL FIELD

The present invention relates to a thickness measuring device, a thickness measuring method, and a thickness measuring program, and more particularly, to a thickness measuring device, a thickness measuring method, and a thickness measuring program, which are for measuring the thickness of a sample using terahertz waves that are transmitted through or reflected from the sample.

BACKGROUND ART

In recent years, in order to confirm processing and manufacturing conditions of semiconductors, flat panel displays, micro-precision parts, and the like, it is necessary to perform high-precision measurements on the thickness, shape, and surface roughness of micro-precision parts, such as the semiconductors.

In particular, various types of thin films are being manufactured on the surface of an object in the process of manufacturing micro-precision parts. Here, the thin film refers to layers that are formed on a surface of a base material or substrate with a very fine thickness. In general, the thickness of the thin film very closely affects the performance of a product, and thus it is necessary to precisely measure the thickness of the thin film in a manufacturing process and reflect the measurement in the process.

Further, in recent years, there has been a growing demand for measuring thin film thicknesses in fine regions of an opaque thin film, which is composed of a material opaque in visible light, as well as a conventional transparent thin film. The shape and thickness of the micro-precision parts very closely affect the performance of a product, and thus there is a need to precisely measure the thickness of the micro-precision parts in a manufacturing process and reflect the measurement in the process.

To meet such needs, various thickness measuring devices and methods have been developed. For example, Korean Patent Publication No. 10-2013-0012419 (Application No.: 10-2011-0073614, Applicant: SNU Precision Co., Ltd.) discloses a thin film thickness measuring device including a light source, an optical system having an objective lens that focuses light irradiated from the light source onto a thin film and guides the light reflected from the thin film, an aperture stop that is provided a upper part(or top) of the objective lens and adjusts an irradiation area of the light guided to the objective lens, a first detector that measures the thickness of the thin film using light guided from the optical system, and a second detector that detects image data of the thin film using the light guided from the optical system, wherein while the first detector measures the thickness of the thin film, the aperture stop blocks a part of the light, which is guided to the objective lens, and allows only the remaining part to partially pass therethrough.

In addition, various techniques related to a thickness measuring device, a thickness measuring method, and a thickness measuring program are continually being studied and developed.

DISCLOSURE

Technical Problem

It is one aspect of the present invention to provide a thickness measuring device, a thickness measuring method, and a thickness measuring program, which are for measuring a refractive index of a sample using terahertz waves.

It is another aspect of the present invention to provide a thickness measuring device, a thickness measuring method, and a thickness measuring program, which are for measuring a thickness of a sample using terahertz waves.

It is still another aspect of the present invention to provide a thickness measuring device, a thickness measuring method, and a thickness measuring program, which are for measuring a refractive index within a short time in an in-line process.

It is yet another aspect of the present invention to provide a thickness measuring device, a thickness measuring method, and a thickness measuring program, which are for minimizing measurement errors of a refractive index and a thickness caused by a sampling rate.

It is yet another aspect of the present invention to provide a thickness measuring device, a thickness measuring method, and a thickness measuring program, which are for minimizing data processing load while interpolating an error that is caused by a sampling rate.

Aspects of the present invention are not limited to the above.

Technical Solution

One aspect of the present invention provides a thickness measuring device.

According to one embodiment, the thickness measuring device may include: a terahertz wave signal processing unit configured to receive a first reflected terahertz wave, which passes through a surface of a thickness measurement sample and is reflected from a rear surface of the thickness measurement sample, and a second reflected terahertz wave that is reflected from the surface of the thickness measurement sample; a refractive index information acquisition unit configured to acquire refractive index information of the thickness measurement sample in consideration of second-time difference information between the first reflected terahertz wave and the second reflected terahertz wave; and a thickness information acquisition unit configured to acquire thickness information of the thickness measurement sample in consideration of the refractive index information.

According to one embodiment, the refractive index information acquisition unit may acquire refractive index information of the thickness measurement sample by further considering first-time difference information between a first transmitted terahertz wave, which transmits the thickness measurement sample in a thickness direction of the thickness measurement sample, and a second transmitted terahertz wave, which is acquired without transmitting the thickness measurement sample, in addition to the second-time difference information.

According to one embodiment, the signal processing unit may further receive the first transmitted terahertz wave and the second transmitted terahertz wave.

According to one embodiment, the signal processing unit may receive the first transmitted terahertz wave and the second transmitted terahertz wave at a predetermined sampling rate, and the signal processing unit may interpolate a terahertz wave, which is distorted due to the sampling rate, among the first transmitted terahertz wave and the second transmitted terahertz wave.

According to one embodiment, the signal processing unit may receive the first reflected terahertz wave and the second reflected terahertz wave at a predetermined sampling rate, and the signal processing unit may interpolate a terahertz wave, which is distorted due to the sampling rate, among the first reflected terahertz wave and the second reflected terahertz wave.

According to one embodiment, the signal processing unit may selectively interpolate a specific terahertz wave whose left and right symmetry is distorted around a peak point among the received terahertz waves.

According to one embodiment, the signal processing unit may operate in a transmission mode, in which the first and second transmitted terahertz waves forming a pair are repeatedly received a predetermined number of times, and in a reflection mode in which the first and second reflected terahertz waves forming a pair are repeatedly received a predetermined number of times, and the predetermined number of times in the transmission mode may be greater than the predetermined number of times in the reflection mode.

According to one embodiment, the refractive index information acquisition unit may use $$n = \frac{1}{1 - 2 \cdot \frac{\Delta t d_1}{\Delta t d_2}}$$

as an equation for calculating a refractive index of the thickness measurement sample.

According to one embodiment, the thickness information acquisition unit may use $$d_E = C \cdot \frac{\Delta t d_2}{2 \cdot n}$$

as an equation for calculating a thickness of the thickness measurement sample.

Another aspect of the present invention provides a thickness measuring method.

According to one embodiment, the thickness measuring method may include receiving a terahertz wave configured to receive a first reflected terahertz wave, which passes through a surface of a thickness measurement sample and is reflected from a rear surface of the thickness measurement sample, and a second reflected terahertz wave that is reflected from the surface of the thickness measurement sample, calculating a refractive index configured to acquire refractive index information of the thickness measurement sample in consideration of second-time difference information between the first and second reflected terahertz waves, and calculating a thickness configured to acquire thickness information of the thickness measurement sample in consideration of the refractive index information.

According to one embodiment, first-time difference information between a first transmitted terahertz wave, which transmits the thickness measurement sample in a thickness direction of the thickness measurement sample, and a second transmitted terahertz wave, which is acquired without transmitting the thickness measurement sample may be further considered in addition to the second-time difference information to acquire refractive index information of the thickness measurement sample.

According to one embodiment, the receiving the terahertz wave may further include receiving the first transmitted terahertz wave and the second transmitted terahertz wave.

According to one embodiment, the receiving the terahertz wave may further include receiving the first transmitted terahertz wave and the second transmitted terahertz wave at a predetermined sampling rate, and interpolating a terahertz wave, which is distorted due to the sampling rate, among the first transmitted terahertz wave and the second transmitted terahertz wave.

According to one embodiment, the receving the terahertz wave may further include receiving the first reflected terahertz wave and the second reflected terahertz wave at a predetermined sampling rate and interpolating a terahertz wave, which is distorted due to the sampling rate, among the first reflected terahertz wave and the second reflected terahertz wave.

According to one embodiment, the receiving the terahertz wave may further include selectively interpolating a specific terahertz wave whose left and right symmetry is distorted around a peak point among the received terahertz waves.

According to one embodiment, in the receiving the terahertz wave, a transmission mode, in which the first and second transmitted terahertz waves forming a pair are repeatedly received a predetermined number of times, and a reflection mode in which the first and second reflected terahertz waves forming a pair are repeatedly received a predetermined number of times may be performed, and the predetermined number of times in the transmission mode may be greater than the predetermined number of times in the reflection mode.

According to one embodiment, in the calculating the refractive index, $$n = \frac{1}{1 - 2 \cdot \frac{\Delta t d_1}{\Delta t d_2}}$$

may be used as an equation for calculating a refractive index of the thickness measurement sample.

According to one embodiment, in the calculating the thickness calculation, $$d_E = C \cdot \frac{\Delta t d_2}{2 \cdot n}$$

may be used as an equation for calculating a thickness of the thickness measurement sample.

Still another aspect of the present invention provides a thickness measuring program that is stored in a medium.

According to one embodiment, a computer program stored in the medium may include: receiving a terahertz wave configured to receive a first reflected terahertz wave, which passes through a surface of a thickness measurement sample and is reflected from a rear surface of the thickness measurement sample, and a second reflected terahertz wave, which is reflected from the surface of the thickness measurement sample, through a terahertz wave signal processing unit; calculating a refractive index configured to acquire refractive index information of the thickness measurement sample through a refractive index information acquisition unit in consideration of second-time difference information between the first and second reflected terahertz waves; and calculating a thickness configured to acquirie thickness information of the thickness measurement sample through a thickness information acquisition unit in consideration of the refractive index information.

According to one embodiment, the calculating the refractive index may further include further considering first-time difference information between a first transmitted terahertz wave, which transmits the thickness measurement sample in a thickness direction of the thickness measurement sample, and a second transmitted terahertz wave, which is acquired without transmitting the thickness measurement sample in addition to the second-time difference information.

According to one embodiment, the receiving the terahertz wave may further include receiving the first and second reflected terahertz waves at a predetermined sampling rate, and interpolating a terahertz wave, which is distorted due to the sampling rate, among the first and second reflected terahertz waves.

Advantageous Effects

A thickness measuring device according to an embodiments of the present invention can include: a terahertz wave signal processing unit configured to receive a first reflected terahertz wave, which passes through a surface of a thickness measurement sample and is reflected from a rear surface of the thickness measurement sample, and a second reflected terahertz wave that is reflected from the surface of the thickness measurement sample; a refractive index information acquisition unit configured to acquire refractive index information of the thickness measurement sample in consideration of second-time difference information between the first reflected terahertz wave and the second reflected terahertz wave; and a thickness information acquisition unit configured to acquire thickness information of the thickness measurement sample in consideration of the refractive index information.

In other words, the thickness measuring device according to the embodiment can acquire a refractive index of the thickness measurement sample using a terahertz wave that is irradiated toward the thickness measurement sample and can acquire a thickness of the thickness measurement sample using the acquired refractive index. Accordingly, the thickness measuring device according to the embodiment can measure both the refractive index and the thickness of the thickness measurement sample within a short time.

Further, the thickness measuring device according to the embodiment can interpolate received terahertz waves. Thus, a more accurate refractive index and thickness can be measured than before being interpolated.

Further, the thickness measuring device according to the embodiment can selectively interpolate a specific terahertz wave whose left and right symmetry is distorted around a peak point among received terahertz waves. Accordingly, the throughput of terahertz waves to be interpolated among the received terahertz waves can be reduced. As a result, the amount of data to be calculated in the thickness measuring device according to the embodiment can be reduced so that a speed reduction phenomenon due to data overload can be prevented.

DESCRIPTION OF DRAWINGS

FIG. 6 is a graph illustrating a second reflected terahertz wave is received by a second detector according to the reflection mode of the thickness measuring device according to the embodiment of the present invention is in the reflection mode.

MODES OF THE INVENTION

Figure 1:
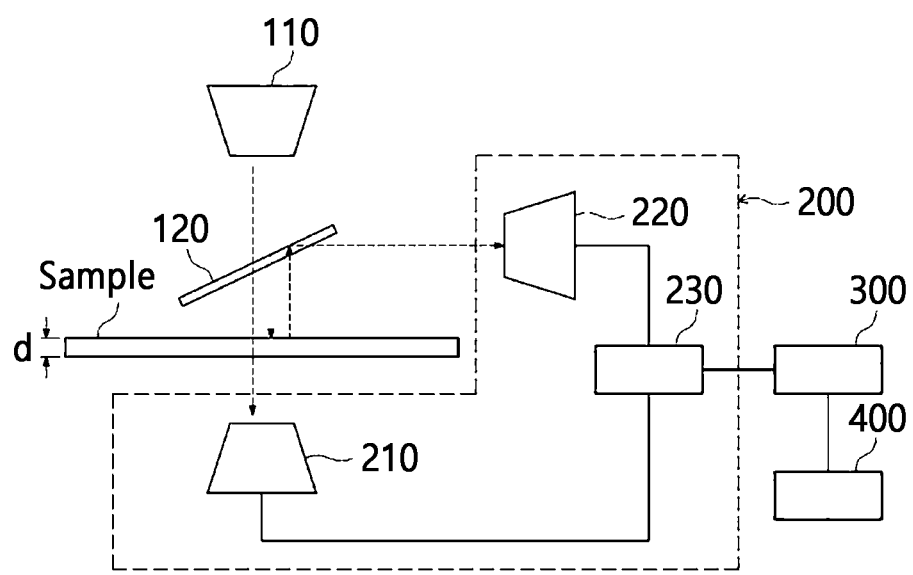
FIG. 1 is a drawing illustrating a thickness measuring device according to an embodiment of the present invention.

Hereinafter, exemplary embodiments of the present invention will be described in detail with reference to the accompanying drawings. However, the technical idea of the present invention is not limited to the embodiments described herein but may be embodied in other forms as well. Rather, the embodiments introduced herein are provided to enable the disclosed contents to be thorough and complete and to fully provide the idea of the present invention to those skilled in the art.

In the present specification, when one component is described to be on another component, it means that the one component may be formed directly on another component or a third component may be interposed therebetween. In addition, in the drawings, thicknesses of shapes and sizes are exaggerated to effectively describe technical contents of the embodiments.

Moreover, although the terms first, second, third, and the like have been used in various embodiments of the present specification to describe various components, these components should not be limited by those terms. Those terms are used only to distinguish one component from another component. Thus, what is referred to as a first component in one embodiment may be referred to as a second component in other embodiments. Each embodiment described and illustrated herein includes a complementary embodiment thereof. Further, the term 'and/or' is used herein as a meaning that includes at least one of the components listed before and after.

As used herein, the singular forms "a," "an," and "the" are intended to include the plural forms as well, unless the context clearly indicates otherwise. In addition, it should be understood that the terms "comprises," "comprising," "includes," "including," "has," and/or "having," specify the presence of stated features, integers, steps, operations, elements, components and/or combinations thereof described in the specification, but do not preclude the presence or addition of one or more other features, integers, steps, operations, elements, components and/or combinations thereof. Further, in the present specification, "connecting" is used in a meaning that includes both indirectly connecting a plurality of components and directly connecting the plurality of components.

Further, when detailed descriptions of related well-known functions or configurations are deemed to unnecessarily obscure the gist of the present invention in the descriptions of the present invention, they will be omitted.

FIG. 1 is a drawing illustrating a thickness measuring device according to an embodiment of the present invention.

Referring to FIG. 1, the thickness measuring device according to the embodiment may include a terahertz wave irradiation unit 110, a beam splitter 120, a terahertz wave signal processing unit 200, a refractive index information acquisition unit 300, and a thickness information acquisition unit 400. The thickness measuring device according to the embodiment may measure a thickness d of a thickness measurement sample by irradiating terahertz waves to the thickness measurement sample. According to one embodiment, the thickness measurement sample may be an epoxy molding compound (EMC) mold. It is to be understood that the thickness measurement sample is not limited to the EMC mold.

The terahertz wave irradiation unit 110 may irradiate the terahertz waves toward the thickness measurement sample. According to one embodiment, a light source of the terahertz wave may be a pulse type. According to another embodiment, a light source of the terahertz wave may be a continuous type.

The number of light sources of the terahertz wave may be selected according to design specifications. For example, the number of light sources of the terahertz wave may be one or two or more. According to one embodiment, a wavelength of the terahertz wave may be in a range of 3 mm to 30 µm.

According to one embodiment, a frequency of the terahertz wave may be from 0.1 THz to 10 THz. Since the terahertz wave has the above-described frequency range, the terahertz wave may exhibit a transmission power that is greater than that of a visible ray or an infrared ray. In addition, the terahertz wave may also be used where external light is present, and thus it is possible to measure the thickness d of the thickness measurement sample without having a separate process for blocking the external light.

Terahertz Wave Signal Processing Unit 200

The terahertz wave signal processing unit 200 may be configured by including at least one component of a first detector 210, a second detector 220, and a signal interpolator 230.

The first detector 210 may be disposed in a direction facing the terahertz wave irradiation unit 110 based on the thickness measurement sample. The first detector 210 may receive the terahertz waves, which pass through the beam splitter 120 and the thickness measurement sample, among the terahertz waves irradiated by the terahertz wave irradiation unit 110.

The second detector 220 may be disposed between the terahertz wave irradiation unit 110 and the first detector 210 to be spaced apart therefrom by a predetermined distance at an angle of 90° from the terahertz wave irradiation unit 110. The second detector 220 may receive the terahertz waves, which are reflected from a surface and a rear surface of the thickness measurement sample, among the terahertz waves irradiated by the terahertz wave irradiation unit 110.

The signal interpolator 230 may receive terahertz waves, which are acquired by the first and second detectors 210 and 220, to perform predetermined signal processing. For example, the signal interpolator 230 may interpolate the terahertz waves, which are distorted due to a sampling rate, among the terahertz waves received by the first and second detectors 210 and 220. The interpolation of the terahertz waves that are distorted due to the sampling rate will be described below.

The above-described terahertz wave signal processing unit 200 may perform in a transmission mode and a reflection mode. The transmission mode may be for repeatedly receiving first and second transmitted terahertz waves forming a pair a predetermined number of times. The reflection mode may be for repeatedly receiving first and second reflected terahertz waves forming a pair a predetermined number of times.

Hereinafter, the transmission mode according to one embodiment of the present invention will be described with reference to FIGS. 2 and 3, and the reflection mode according to one embodiment of the present invention will be described with reference to FIGS. 4 and 5.

Transmission Mode

Figure 2:
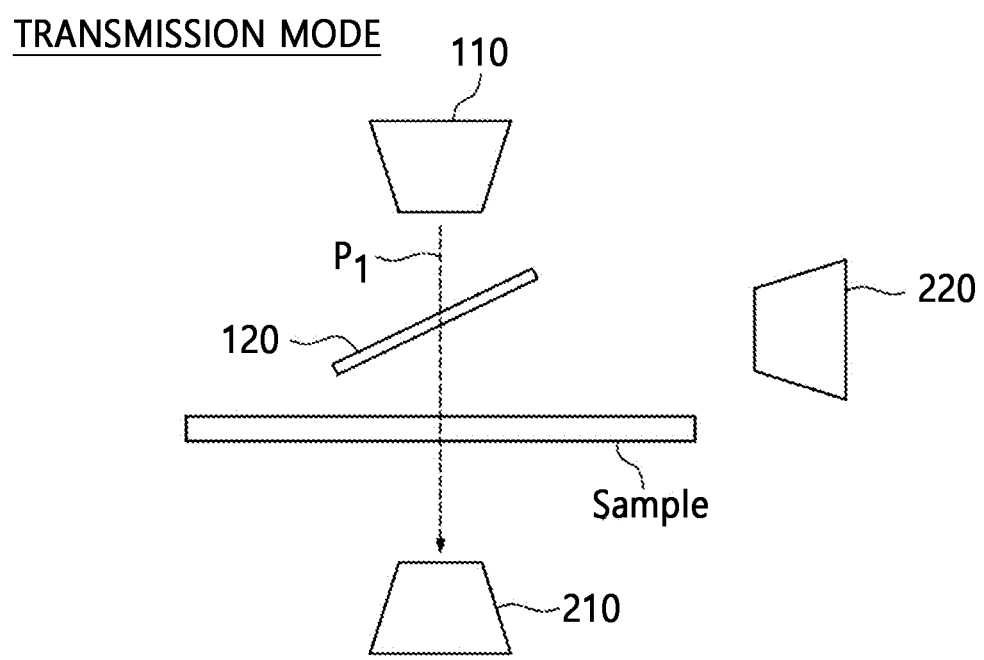
FIGS. 2 and 3 are drawings illustrating a transmission mode of the thickness measuring device according to the embodiment of the present invention.
Figure 3:
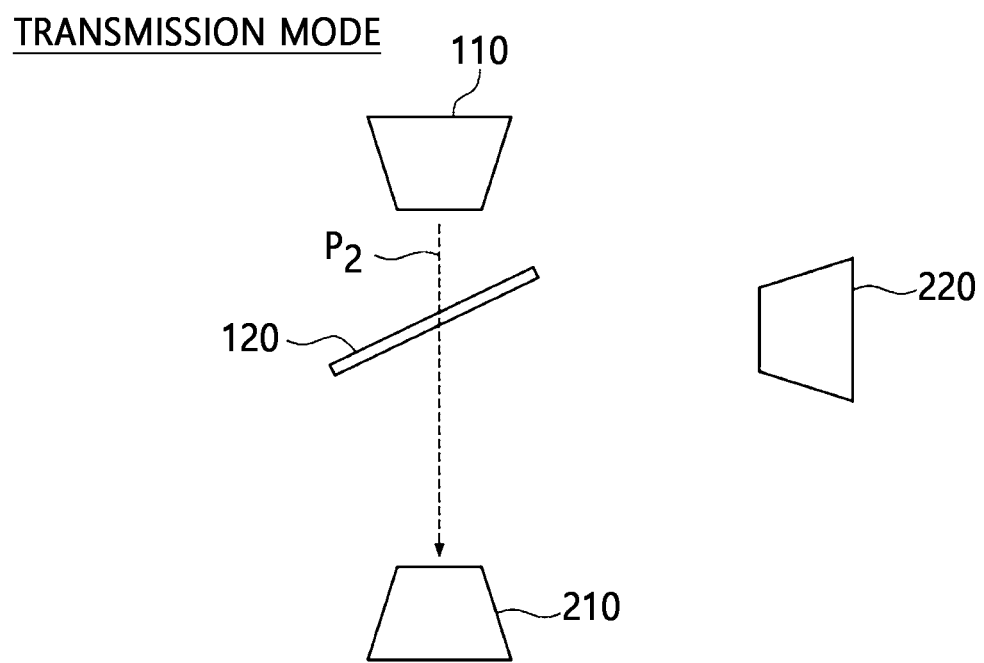

FIGS. 2 and 3 are drawings illustrating the transmission mode of the thickness measuring device according to the embodiment of the present invention.

Referring to FIG. 2, in the transmission mode, the first detector 210 may acquire a first transmitted terahertz wave $P_1$, which transmits the beam splitter 120 and the thickness measurement sample in a thickness d direction, among the terahertz waves irradiated by the terahertz wave irradiation unit 110. Here, the first detector 210 may acquire the first transmitted terahertz wave $P_1$ at a predetermined sampling rate.

In addition, referring to FIG. 3, in the transmission mode, the first detector 210 may acquire a second transmitted terahertz wave $P_2$, which transmits the beam splitter 120, among the terahertz waves irradiated by the terahertz wave irradiation unit 110. Here, the first detector 210 may acquire the second transmitted terahertz wave $P_2$ at a predetermined sampling rate.

That is, in the transmission mode, the first detector 210 may receive the first transmitted terahertz wave $P_1$, which is transmitted in the thickness d direction of the thickness measurement sample, and the second transmitted terahertz wave $P_2$ that is acquired without having the thickness measurement sample.

Accordingly, in the transmission mode, the signal interpolator 230 may acquire first-time difference information. The first-time difference information may be a time difference between the first transmitted terahertz wave $P_1$ and the second transmitted terahertz wave $P_2$, which are measured in the transmission mode. Specifically, the first-time difference information may be a time difference between a peak point of the first transmitted terahertz wave $P_1$ and a peak point of the second transmitted terahertz wave $P_2$. Here, the first-time difference information may be an absolute value.

In addition, according to one embodiment, the first-time difference information in the transmission mode may have an average value of values that are repeatedly acquired a predetermined number of times, for example, five times.

The transmission mode according to one embodiment of the present invention has been described above with reference to FIGS. 2 and 3. The first-time difference information may be acquired in the above-described transmission mode. The first-time difference information may be used by the thickness measuring device to acquire refractive index information, which will be described below. Hereinafter, the reflection mode according to one embodiment of the present invention will be described with reference to FIGS. 4 and 5.

Reflection Mode

Figure 4:
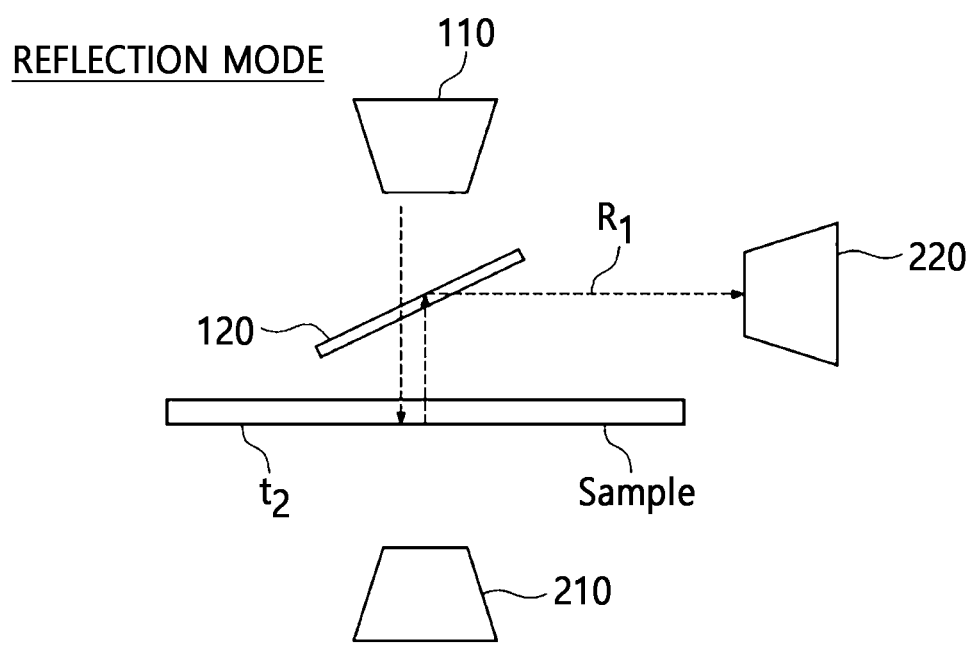
FIGS. 4 and 5 are drawings illustrating a reflection mode of the thickness measuring device according to the embodiment of the present invention.
Figure 5:
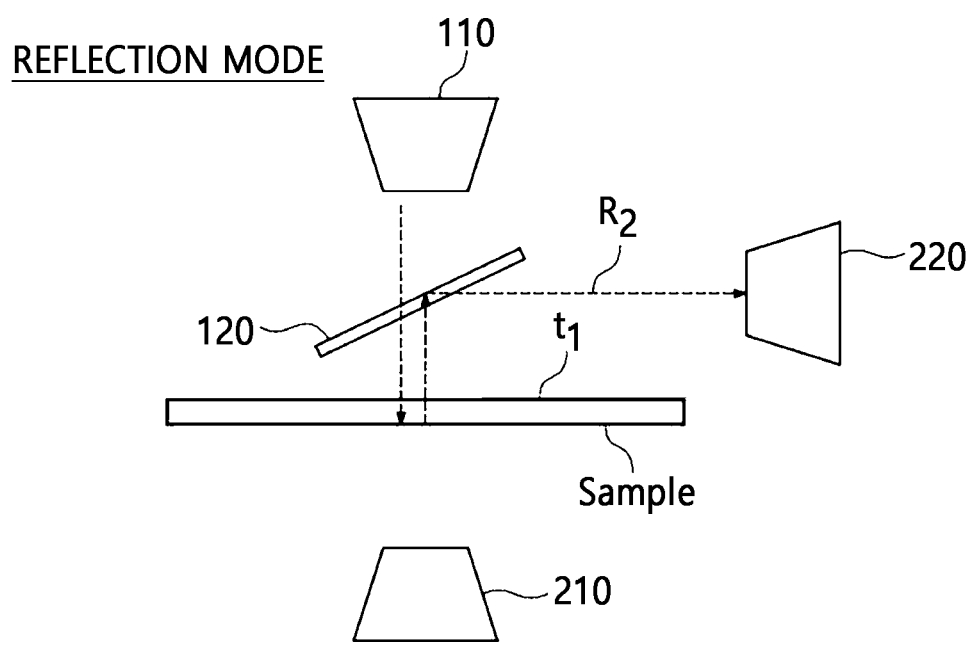

FIGS. 4 and 5 are drawings illustrating the reflection mode of the thickness measuring device according to the embodiment of the present invention.

Referring to FIG. 4, in the reflection mode, the second detector 220 may acquire a first reflected terahertz wave $R_1$, which passes through a surface $t_1$ of the thickness measurement sample and is reflected from a rear surface $t_2$ of the thickness measurement sample, among the terahertz waves irradiated by the terahertz wave irradiation unit 110. Here, the second detector 220 may acquire the first reflected terahertz wave $R_1$ at a predetermined sampling rate.

In addition, referring to FIG. 5, in the reflection mode, the second detector 220 may acquire a second reflected terahertz wave $R_2$, which is reflected from the surface $t_i$ of the thickness measurement sample, among the terahertz waves irradiated by the terahertz wave irradiation unit 110. Here, the second detector 220 may acquire the second reflected terahertz wave $R_2$ at a predetermined sampling rate.

That is, in the reflection mode, the second detector 220 may receive the first reflected terahertz wave $R_1$, which passes through the surface $t_1$ of the thickness measurement sample and is reflected from the rear surface $t_2$, and the second reflected terahertz wave $R_2$ that is reflected from the surface $t_1$ of the thickness measurement sample.

Accordingly, in the reflection mode, the signal interpolator 230 may acquire second-time difference information. The second-time difference information may have a time difference between the first reflected terahertz wave $R_1$ and the second reflected terahertz wave $R_2$, which are measured in the reflection mode. Specifically, the second-time difference information may have a time difference between a peak point of the first reflected terahertz wave $R_1$ and a peak point of the second reflected terahertz wave $R_2$. It is to be understood that the second-time difference information may have an absolute value.

In addition, according to one embodiment, the second-time difference information in the reflection mode may have an average value of values that are repeatedly acquired a predetermined number of times, for example, five times.

The transmission mode and the acquisition of the time difference information in the transmission mode, and the reflection mode and the acquisition of the time difference information in the reflection mode, according to one embodiment of the present invention, have been described above with reference to FIGS. 2 to 5. Hereinafter, the refractive index information acquisition unit 300 will be described with reference to FIG. 1 again.

Refractive Index Information Acquisition Unit 300

Referring to FIG. 1 again, the refractive index information acquisition unit 300 may acquire refractive index information of the thickness measurement sample in consideration of the first-time difference information and the second-time difference information that are acquired by the terahertz wave signal processing unit 200.

The refractive index information acquisition unit 300 may use Equation 1 below as an equation for calculating a refractive index of the thickness measurement sample, $$n = \frac{1}{1 - 2 \cdot \frac{\Delta td_1}{\Delta td_2}} \quad \langle\text{Equation 1}\rangle$$

(n: refractive index, $\Delta td_1$: time difference between the first transmitted terahertz wave and the second transmitted terahertz wave, $\Delta td_2$: time difference between the first reflected terahertz wave and the second reflected terahertz wave).

For reference, Equation 2 and Equation 3 below may be used to calculate Equation 1, $$\Delta td_1 = \frac{d_E}{C}(n-1) \quad \langle\text{Equation 2}\rangle$$

($\Delta td_1$: time difference between the first transmitted terahertz wave and the second transmitted terahertz wave, n: refractive index, $d_E$: thickness of the thickness measurement sample, C: speed of light in the air).

$$n = \frac{C}{\frac{2 \cdot d_E}{\Delta td_2}} \Leftrightarrow d_E = C \cdot \frac{\Delta td_2}{2 \cdot n} \quad \langle\text{Equation 3}\rangle$$

($d_E$: thickness of the thickness measurement sample, C: speed of light in the air, $\Delta td_2$: time difference between the first reflected terahertz wave and the second reflected terahertz wave, n: refractive index).

Equation 1 may be calculated through Equation 4 below, which is summarized by inserting Equation 3 into Equation 2, $$\Delta td_1 = \left(C \cdot \frac{\Delta td_2}{2 \cdot n}\right) \cdot \frac{1}{C}(n-1) \quad [\text{Equation 4}]$$
$$2 \cdot n \cdot \Delta td_1 = \Delta td_2 \cdot n - \Delta td_2$$
$$n = \frac{\Delta td_2}{\Delta td_2 - 2 \cdot \Delta td_1} = \frac{1}{1 - 2 \cdot \frac{\Delta td_1}{\Delta td_2}}$$

(C: speed of light in air, $\Delta td_1$: time difference between first transmitted terahertz wave and second transmitted terahertz wave, $\Delta td_2$: time difference between first reflected terahertz wave and second reflected terahertz wave, n: refractive index).

As a result, the refractive index information acquisition unit 300 may acquire the refractive index information of the thickness measurement sample in consideration of the first and second-time difference information of the terahertz waves that are acquired in the transmission mode and the reflection mode. In particular, the refractive index information acquisition unit 300 may acquire the refractive index information of the thickness measurement sample in an in-line manner so that the operation may be performed quickly and conveniently. The refractive index information of the thickness measurement sample, which is acquired by the refractive index information acquisition unit 300, may be used by the thickness information acquisition unit 400, which will be described below, to acquire thickness information of the thickness measurement sample.

Thickness Information Acquisition Unit 400

The thickness information acquisition unit 400 may acquire the information of the thickness d of the thickness measurement sample in consideration of the refractive index information that is calculated by the method according to Equation 1.

The thickness information acquisition unit 400 may use Equation 5 below as an equation for calculating the refractive index of the thickness measurement sample, $$d_E = C \cdot \frac{\Delta td_2}{2 \cdot n} \qquad \langle \text{Equation 5} \rangle$$

($d_E$: thickness of the thickness measurement sample, C: speed of light in the air, n: refractive index, $\Delta td_2$: time difference between the first reflected terahertz wave and the second reflected terahertz wave).

That is, the thickness information acquisition unit 400 may acquire the thickness information of the thickness measurement sample by acquiring the refractive index information in consideration of the first and second-time difference information by the above-described refractive index information acquisition unit 300 and substituting the acquired refractive index information into Equation 5.

As described above, the thickness measuring device according to the embodiment may acquire the refractive index of the thickness measurement sample using the terahertz waves that have irradiated toward the thickness measurement sample and acquire the thickness d of the thickness measurement sample using the acquired refractive index. Accordingly, the thickness measuring device according to the embodiment may measure both the refractive index and the thickness of the thickness measurement sample within a short time.

It is to be understood that the refractive index information acquisition unit 300 and the thickness information acquisition unit 400 may acquire the refractive index and the thickness information of the thickness measurement sample by using the average value of the values of the first and second-time difference information when the first-time difference information and the second-time difference information are acquired repeatedly.

The thickness measuring device according to the embodiment of the present invention has been described above. Hereinafter, the improvement of thickness measurement accuracy of the thickness measuring device according to one embodiment of the present invention will be described with reference to FIGS. 6 to 8.

Figure 7B:
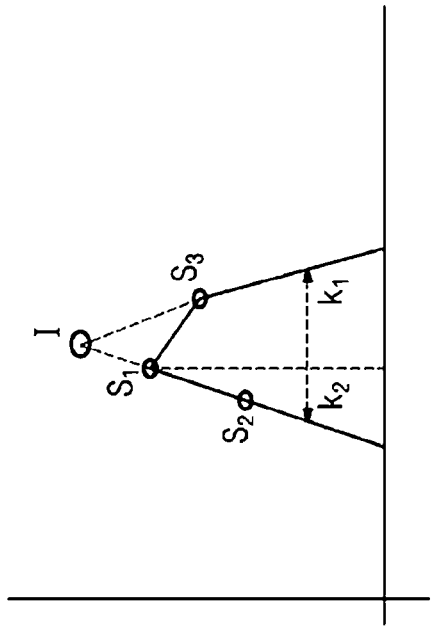
FIG. 7 is a graph illustrating an interpolation method of a second reflected terahertz wave in a thickness measuring method according to the embodiment of the present invention.
Figure 7A:
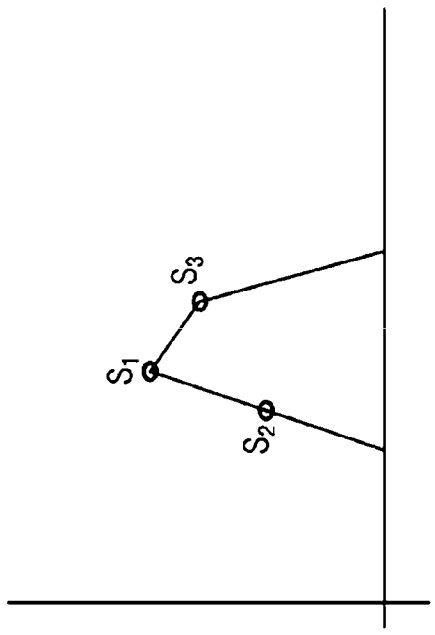
Figure 8:
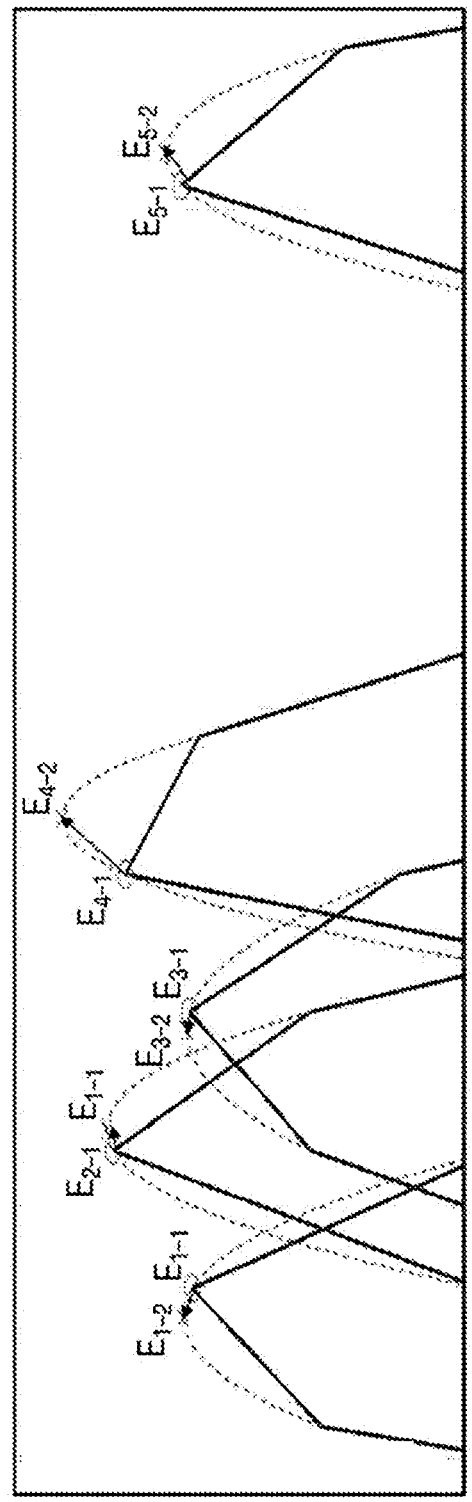
FIG. 8 is a graph comparing before and after interpolation of the second reflected terahertz wave in the thickness measuring method according to the embodiment of the present invention.

FIGS. 6 to 8 are drawings for describing the improvement of the thickness measurement accuracy of the thickness measuring device according to one embodiment of the present invention. Specifically, FIG. 6 is a graph illustrating the second reflected terahertz wave is received by the second detector according to the reflection mode of the thickness measuring device according to the embodiment of the present invention is in the reflection mode, FIG. 7 is a graph illustrating an interpolation method of the second reflected terahertz wave in a thickness measuring method according to the embodiment of the present invention, and FIG. 8 is a graph comparing before and after interpolation of the second reflected terahertz wave in the thickness measuring method according to the embodiment of the present invention.

Referring to FIGS. 1 to 5 described above, the first and second transmitted terahertz waves $P_1$ and $P_2$ and the first and second reflected terahertz waves $R_1$ and $R_2$, which are received by the first and second detectors 210 and 220, may be distorted by various causes, for example, the sampling rate for the signal processing of the terahertz wave and the vibrating of the terahertz wave irradiation unit accompanying the generation of the terahertz wave.

The signal interpolator 230 may interpolate the terahertz waves, which are distorted due to the sampling rate, among the first and second transmitted terahertz waves $P_1$ and $P_2$ and the first and second reflected terahertz waves $R_1$ and $R_2$, which are received by the first and second detectors 210 and 220. For convenience of description, the interpolation method will be described on the basis of the reflected terahertz wave, but it is to be understood that the interpolation method may be applied to the transmitted terahertz wave.

Referring to FIG. 6A, FIG. 6A is a graph in which the first and second reflected terahertz waves $R_1$ and $R_2$ are repeatedly received, and FIG. 6B is an enlarged graph of portion A of FIG. 6A. Referring to FIG. 6, the first and second reflected terahertz waves $R_1$ and $R_2$ may be repeatedly received a predetermined number of times, for example, five times. That is, as shown in FIG. 6B, the first reflected terahertz waves $R_1$, which are received five times by the second detector 220, may be represented by $E_{1-1}$, $E_{2-1}$, $E_{3-1}$, $E_{4-1}$, and $E_{5-1}$. According to one embodiment, it is to be understood that the number of times the first and second transmitted terahertz waves $P_1$ and $P_2$ are repeatedly received may be less or more than five times.

FIG. 7A is a graph illustrating a method of interpolating the first reflected terahertz wave $R_1$ for region B ($E_{5-1}$) of FIG. 6B, and FIG. 7B is a graph illustrating the first reflected terahertz wave $R_1$ that is interpolated by the method described in FIG. 7A.

Referring to FIG. 7A, it may be seen that, in the case of the first reflected terahertz wave $R_1$ ($E_{5-1}$), a signal is input in the order of $S_2$, $S_1$, and $S_3$ according to the sampling rate. In this case, the signal interpolator 230 may determine that the coordinates of $S_2$ are ($x_2$, $y_2$), the coordinates of $S_1$ are ($x_1$, $y_1$), and the coordinates of $S_3$ are ($x_3$, $y_3$). Here, the terahertz wave signal processing unit 200 may determine that a peak of the first reflected terahertz wave R1 ($E_{5-1}$) is $S_1$ due to the sampling rate, but when the peak is recognized as $S_1$, an error may occur between the time point at which $S_1$ is recognized and the time point at which the peak is actually received, and thus accumulated errors in the refractive index and the thickness may occur.

Therefore, in order to reduce the error due to the sampling rate, the signal interpolator 230 may select a function model that the first reflected terahertz wave $R_1$ ($E_{5-1}$) will have in a case in which there is no distortion due to the sampling rate. For example, the signal interpolator 230 may select the function model of the first reflected terahertz wave $R_1$ ($E_{5-1}$) as $y=ax^2+bx+c$. It is to be understood that the function model is a two-dimensional function only for convenience of description, and that other function models may be selected.

The signal interpolator 230 may insert the coordinates of $S_1$, $S_2$, and $S_3$ into the selected function model. Here, the signal interpolator 230 may obtain $y_1=ax_1^2+bx_1+c$ by inserting the coordinates of $S_1$ in the function model, $y_2=ax_2^2+bx_2+c$ by inserting the coordinates of $S_2$ in the function model, and $y_3=ax_3^2+bx_3+c$ by inserting the coordinates of $S_3$ in the function model.

The function in which the coordinates of $S_1$, $S_2$, and $S_3$ are substituted may be summarized by Equation 6 below, $$\begin{bmatrix} y_1 \\ y_2 \\ y_3 \end{bmatrix} = \begin{bmatrix} x_1^2 & x_1 & 1 \\ x_2^2 & x_2 & 1 \\ x_3^2 & x_3 & 1 \end{bmatrix} \cdot \begin{bmatrix} a \\ b \\ c \end{bmatrix} \leftrightarrow Y = X \cdot C. \qquad \langle \text{Equation 6} \rangle$$

When an unknown C is calculated by Equation 6 above, it may be expressed as $C=X^{-1}Y$.

When the peak point is obtained using $C=X^{-1}Y$ and $y=ax^2+bx+c$, the peak point may be represented by $x_{peak}=-b/2a$ and $y_{peak}=f(-b/2a)$.

Accordingly, as shown in FIG. 7B, the signal interpolator 230 may obtain $x_{peak}=-b/2a$ and $y_{peak}=f(-b/2a)$ as coordinates of a peak point I of the interpolated first reflected terahertz wave $R_1$. As shown in FIG. 7B, the interpolated time point for the received peak may be corrected to a time point that is slightly later than $S_1$.

As a result, the signal interpolator 230 may determine a more accurate reception time of the terahertz wave according to the signal interpolation method described above even when the acquired terahertz wave is distorted due to the sampling rate.

As illustrated in FIG. 8, when the first reflected terahertz wave $R_1$ is repeatedly received five times, the interpolation may be performed on the repeatedly received first reflected terahertz waves $R_1$. The interpolated first reflected terahertz waves $R_1$ are illustrated as $E_{1-2}$, $E_{2-2}$, $E_{3-2}$, $E_{4-2}$, and $E_{5-2}$. As illustrated in FIG. 8, peak points of the first reflected terahertz waves $R_1$ before being interpolated may be corrected to have accurate values by the interpolation. Accordingly, when the interpolated first reflected terahertz waves $R_1$ $R_1$ are used in calculating the refractive index of the thickness measurement sample, a more accurate refractive index may be acquired.

The method of interpolating the first reflected terahertz waves $R_1$ that are distorted due to the sampling rate, which is described above with reference to FIGS. 6 to 8, may also be applied to the second reflected terahertz waves $R_2$, the first transmitted terahertz waves $P_1$, and the second transmitted terahertz waves $P_2$, which are distorted due to the sampling rate. Accordingly, more accurate refractive index and thickness may be acquired when calculating the refractive index and thickness of the thickness measurement sample that will be described below.

Furthermore, the terahertz wave signal processing unit 200 according to one embodiment of the present invention interpolates the received terahertz waves but may select a terahertz wave in which the distortion degree due to the sampling rate is larger than a predetermined reference and interpolate the selected terahertz wave.

Referring to FIG. 7B, the signal interpolator 230 may selectively interpolate a specific terahertz wave whose left and right symmetry is distorted around a peak point among the received terahertz waves. To this end, the signal interpolator 230 may consider the left and right symmetry of the received terahertz wave. More specifically, the signal interpolator 230 may select $S_1$ that may be considered as a peak among the received $S_2$, $S_1$, and $S_1$ points, and compare an area $k_2$ on the left with an area $k_1$ on the right on the basis of $S_1$. Here, when the ratio $k_1/k_2$ has a predetermined value, for example, 90% or more, the signal interpolator 230 may determine that the distortion due to the sampling rate is not large and may not perform the interpolation. Alternatively, when the ratio $k_1/k_2$ is less than 90%, it may be determined that the distortion due to the sampling rate is large and the interpolation may be performed.

Accordingly, the thickness measuring device according to the embodiment may reduce the amount of terahertz waves to be interpolated among the received terahertz waves. As a result, the amount of data to be calculated in the thickness measuring device according to the embodiment may be reduced so that a speed reduction phenomenon due to data overload may be prevented.

The error generation due to the sampling rate and the interpolation method therefor have been described above. Hereinafter, an error generation caused by the vibrating of the terahertz wave irradiation unit and an interpolation method therefor will be described.

Referring to FIGS. 1 to 5 described above, the first and second transmitted terahertz waves P1 and P2 that are received by the first detector 210 may be distorted not only due to the sampling rate for the signal processing of the terahertz waves but also due to the vibrating of the terahertz wave irradiation unit 110 accompanying the generation of the terahertz waves. That is, the terahertz wave irradiation unit 110 uses an oscillator when generating the terahertz wave, and differences may occur between time points of the terahertz waves that are generated through the oscillator so that, as shown in FIG. 6B, the five reflected terahertz waves $E_{1-1}$, $E_{2-1}$, $E_{3-1}$, $E_{4-1}$, and $E_{5-1}$ may be received at intervals from each other.

In particular, the distortion due to the vibrating of the terahertz wave irradiation unit 110 may be generated more in the transmission mode than in the reflection mode. This is because, in the transmission mode, the first transmitted terahertz wave $P_1$ and the second transmitted terahertz wave $P_2$, which form a pair, are separate terahertz waves, whereas in the reflection mode, the first reflected terahertz wave $R_1$ and the second reflected terahertz wave $R_2$, which form a pair, are the same terahertz wave. Accordingly, in the reflection mode, the distortion caused due to the vibrating of the terahertz wave irradiation unit 110 may be canceled while acquiring the second-time difference information between the first and second reflected terahertz waves $R_1$ and $R_2$, so that the distortion due to the vibrating of the terahertz wave irradiation unit 110 may be further exposed to the error in the transmission mode.

Therefore, in order to interpolate the first and second transmitted terahertz waves $P_1$ and $P_2$ that are distorted due to the vibrating of the terahertz wave irradiation unit 110, the signal interpolator 230 may receive the first and second transmitted terahertz waves $P_1$ and $P_2$ and the first and second reflected terahertz waves $R_1$ and $R_2$ by increasing the number of reception repetitions of the paired first and second transmitted terahertz waves $P_1$ and $P_2$ more than that of the paired first and second reflected terahertz waves $R_1$ and $R_2$. That is, when the terahertz wave signal processing unit 200 acquires the second-time difference information with the average value by repeating the reflection mode five times, the terahertz wave signal processing unit 200 may acquire the first-time difference information with the average value by repeating the transmission mode ten times. As a result, the terahertz wave signal processing unit 200 may minimize the error that may occur when acquiring the first-time difference information.

Meanwhile, the terahertz wave signal processing unit 200 may set the sampling rate in the transmission mode to be higher than the sampling rate in the reflection mode. As a result, the terahertz wave signal processing unit 200 may minimize the error due to the sampling rate that occurs in the transmission mode. Accordingly, the terahertz wave signal processing unit 200 may minimize the error by applying a high sampling rate when processing the signals in the transmission mode that is further exposed to an environment in which errors are generated, and improve a data processing speed by applying a low sampling rate when processing the signals in the reflection mode that is less exposed to an environment in which errors are generated.

The configuration for improving the thickness measurement accuracy according to one embodiment of the present invention has been described with reference to FIGS. 6 to 8. Hereinafter, a thickness measuring method according to one embodiment of the present invention will be described with reference to FIGS. 9 to 12.

FIGS. 9 to 12 are flowcharts illustrating the thickness measuring method according to the embodiment of the present invention.

Figure 9:
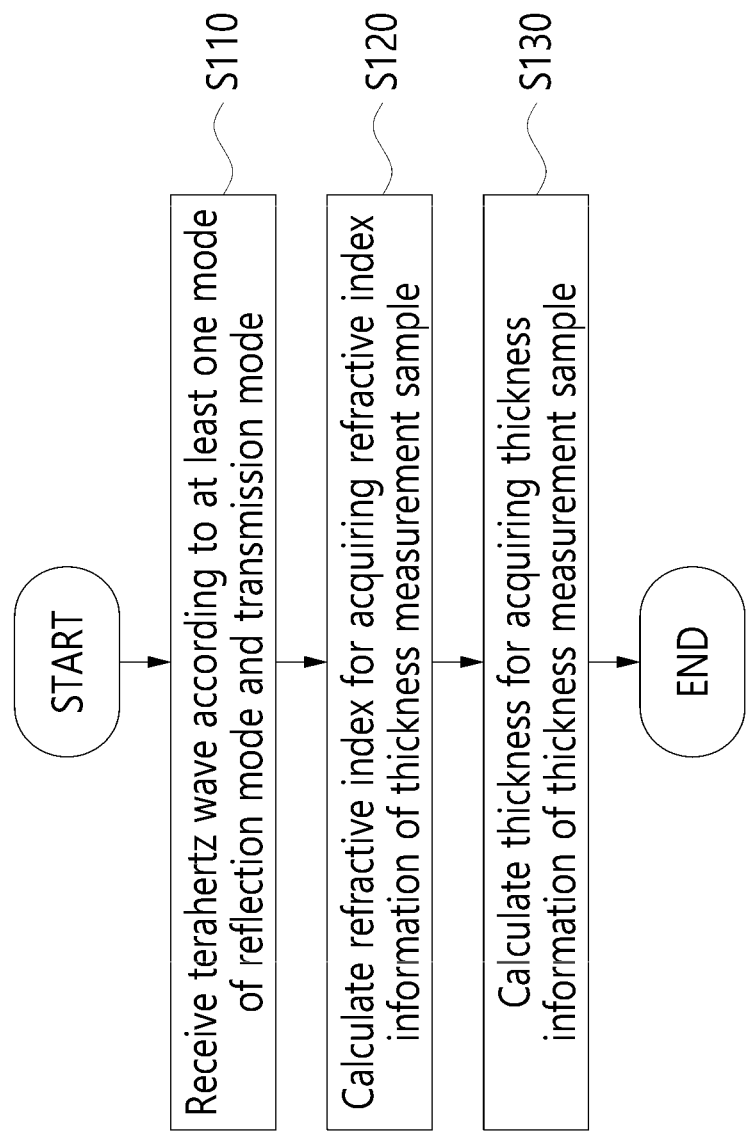
FIGS. 9 to 12 are flowcharts illustrating the thickness measuring method according to the embodiment of the present invention.

Referring to FIG. 9, the thickness measuring method according to the embodiment may include receiving a terahertz wave according to at least one of a reflection mode and a transmission mode (S110), calculating a refractive index to acquire refractive index information of a thickness measurement sample (S120), and calculating a thickness to acquire thickness information of the thickness measurement sample (S130). Hereinafter, each step will be described in detail.

In step S110, the terahertz wave according to at least one of the reflection mode and the transmission mode may be received. In order to describe step S110 in detail, reference will be made to FIG. 10. In describing each steps, portions that overlap with the portions described above will be briefly described.

Step S110

Figure 10:
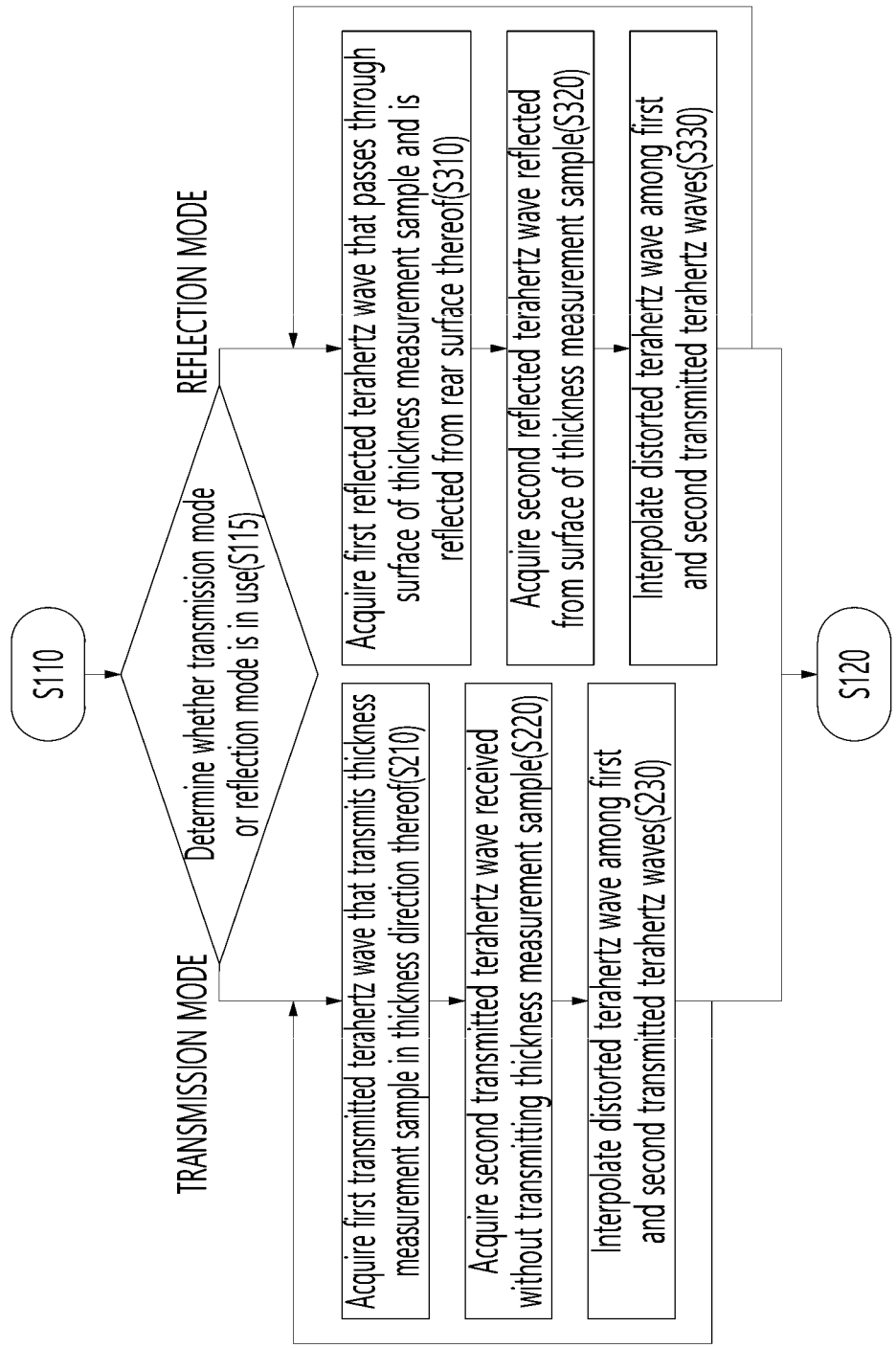

Referring to FIG. 10, according to the mode determined in step S115, step S110 may include steps S210, S220, and S230 in the case of the transmission mode and may include steps S310, S320, and S330 in the case of the reflection mode.

When it is determined in step S115 that it is the transmission mode, acquiring a first transmitted terahertz wave $P_1$ that transmits the thickness measurement sample in a thickness direction (S210), acquiring a second transmitted terahertz wave $P_2$ that is received without transmitting the thickness measurement sample (S220), and interpolating a distorted terahertz wave among the first and second transmitted terahertz waves $P_1$ and $P_2$ (S230) may be performed. As a result, the signal interpolator 230 may acquire the interpolated first and second transmitted terahertz waves $P_1$ and $P_2$.

The acquiring the first transmitted terahertz wave $P_1$ that transmits the thickness measurement sample in the thickness direction (S210), the acquiring the second transmitted terahertz wave $P_2$ that is received without transmitting the thickness measurement sample (S220), and the interpolating the distorted terahertz wave of the first and second transmitted terahertz waves $P_1$ and $P_2$ (S230) may form a transmission mode cycle, and the transmission mode cycle may be performed repeatedly a predetermined number of times. Accordingly, an accuracy of the calculating the thickness of acquiring the thickness information of the thickness measurement sample (S130) may be improved.

In the thickness measuring method according to the embodiment, the received terahertz waves may be selectively interpolated to reduce the amount of terahertz waves to be interpolated among the received terahertz waves. In order to describe this, reference will be made to FIGS. 11 and 12.

Figure 11:
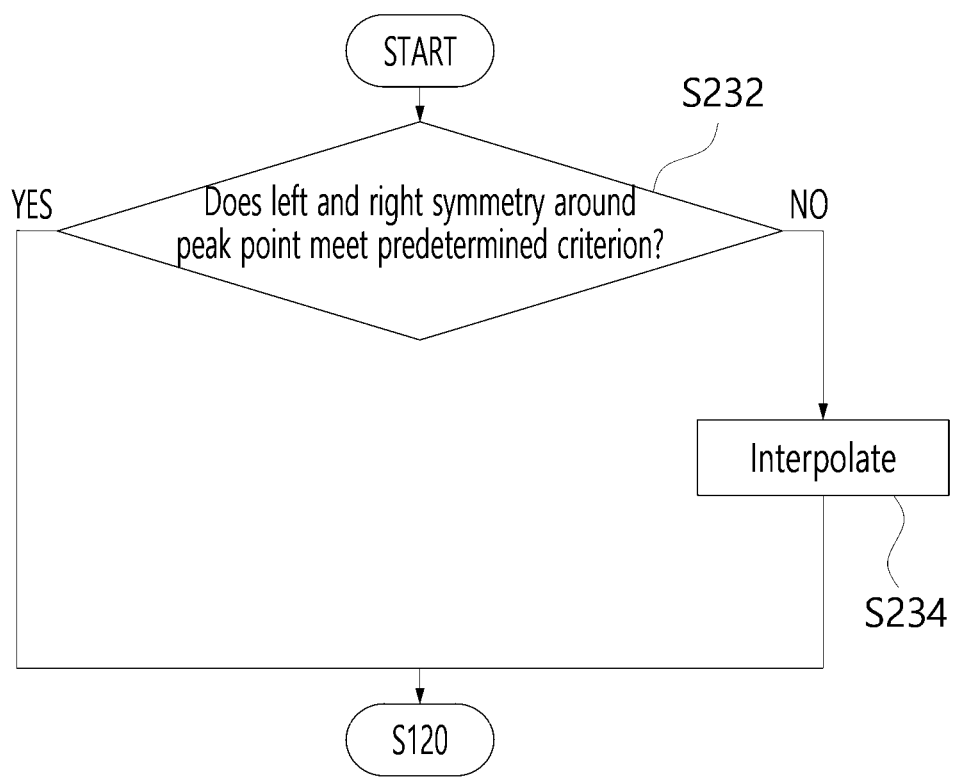

Referring to FIG. 11, the interpolating the distorted terahertz wave among the first and second transmitted terahertz waves $P_1$ and $P_2$ (S230) may further include determining whether left and right symmetry around peak points of the first and second transmitted terahertz waves $P_1$ and $P_2$ meets a predetermined criterion (S232).

When the left and right symmetry meets the predetermined criterion, the calculating refractive index calculation (S120) may be performed without interpolating the first and second transmitted terahertz waves $P_1$ and $P_2$. When the left and right symmetry does not meet the predetermined criterion, the calculating refractive index (S120) may be performed after performing the operation of interpolating the first and second transmitted terahertz waves $P_1$ and $P_2$ (S234).

Referring again to FIG. 10 to describe the thickness measuring method in the reflection mode as well as the thickness measuring method in the transmission mode that are described above, when it is determined in step S115 that it is the reflection mode, acquiring the first reflected terahertz wave $R_1$ that passes through a surface of the thickness measurement sample and is reflected from a rear surface of the thickness measurement sample (S310), acquiring the second reflected terahertz wave $R_2$ that is reflected from the surface of the thickness measurement sample (S320), and interpolating the distorted terahertz wave among the first and second reflected terahertz waves $R_1$ and $R_2$ (S330) may be performed. Accordingly, the signal interpolator 230 may acquire information on the interpolated first and second reflected terahertz waves $R_1$ and $R_2$.

The acquiring the first reflected terahertz wave $R_1$ that passes through the surface of the thickness measurement sample and is reflected by the rear surface of the thickness measurement sample (S310), the acquiring the second reflected terahertz wave $R_2$ that is reflected by the surface of the thickness measurement sample (S320), and the interpolating the distorted terahertz wave among the first and second reflected terahertz waves $R_1$ and $R_2$ (S330) may form a reflection mode cycle, and the reflection mode cycle may be performed repeatedly a predetermined number of times. Accordingly, an accuracy of the calculating thickness configured to acquire the thickness information of the thickness measurement sample (S130) may be improved.

Figure 12:
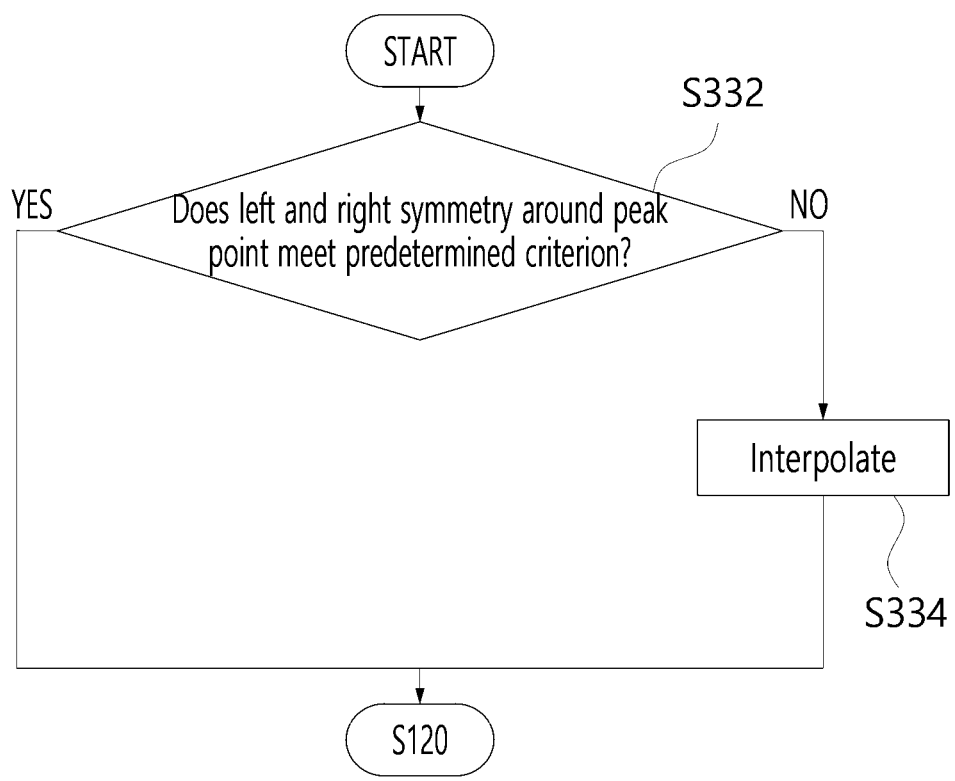

Referring to FIG. 12, the interpolating the distorted terahertz wave among the first and second reflected terahertz waves $R_1$ and $R_2$ (S330) may further include determining whether left and right symmetry around peak points of the first and second reflected terahertz waves $R_1$ and $R_2$ meets a predetermined criterion (S332).

When the left and right symmetry meets the predetermined criterion, the calculating refractive index (S120) may be performed without interpolating the first and second reflected terahertz waves $R_1$ and $R_2$. When the left and right symmetry does not meet the predetermined criterion, the calculating refractive index (S120) may be performed after performing the interpolating the first and second reflected terahertz waves $R_1$ and $R_2$ (S334).

According to one embodiment, the number of times the transmission mode including steps S210 and S220 is repeated may be greater than the number of times the reflection mode including steps S310 and S320 is repeated. Accordingly, it is possible to minimize the error of the transmission mode that is relatively more exposed to the error than the reflection mode.

As a result, the terahertz wave according to at least one of the reflection mode and the transmission mode may be received by step S110.

Step S120

The calculating refractive index (S120) may be performed using the first and second transmitted terahertz waves $P_1$ and $P_2$ and the first and second reflected terahertz waves $R_1$ and $R_2$, which are acquired in step S110 described above. Referring to FIG. 10 again, the calculating refractive index (S120) may use Equation 1 described above as an equation for calculating the refractive index of the thickness measurement sample based on the terahertz wave information acquired in step S110 described above. Accordingly, the refractive index information of the thickness measurement sample may be acquired.

$$n = \frac{1}{1 - 2 \cdot \frac{\Delta td_1}{\Delta td_2}} \quad \langle\text{Equation 1}\rangle$$

(n: refractive index, $\Delta td_1$: time difference between the first transmitted terahertz wave and the second transmitted terahertz wave, $\Delta td_2$: time difference between the first reflected terahertz wave and the second reflected terahertz wave).

Step S130

The calculating thickness (S130) may be performed in consideration of the refractive index that is acquired in the calculation refractive index (S120). Equation 5 described above may be used as an equation for calculating the thickness of the thickness measurement sample. Accordingly, the thickness information of the thickness measurement sample may be acquired.

$$d_E = C \cdot \frac{\Delta td_2}{2 \cdot n} \quad \langle\text{Equation 5}\rangle$$

($d_E$: thickness of the thickness measurement sample, C: speed of light in the air, n: refractive index, $\Delta td_2$: time difference between the first reflected terahertz wave and the second reflected terahertz wave).

A calculation process performed in the calculating refractive index (S120) and a calculation process performed in the calculating thickness (S130) may correspond to the process performed by the refractive index information acquisition unit and the process performed by the thickness information acquisition unit, respectively, which are described with reference to FIGS. 1 to 8.

The above-described thickness measuring method may be provided as a thickness measuring program that is stored in a medium to implement the thickness measuring method. Hereinafter, the thickness measuring program in which the thickness measuring method is stored in the medium will be described.

The thickness measuring program in which the thickness measuring method according to the embodiment is stored in the medium may include: receiving a terahertz wave configured to receive a first reflected terahertz wave, which passes through a surface of a thickness measurement sample and is reflected from a rear surface of the thickness measurement sample, and a second reflected terahertz wave, which is reflected from the surface of the thickness measurement sample, through a terahertz wave signal processing unit; calculating a refractive index configured to acquire refractive index information of the thickness measurement sample through a refractive index information acquisition unit in consideration of second-time difference information between the first and second reflected terahertz waves; and calculating a thickness calculation configured to acquire thickness information of the thickness measurement sample through a thickness information acquisition unit in consideration of the refractive index information.

The calculating refractive index may be stored in the medium to further consider first-time difference information between the first transmitted terahertz wave, which transmits the thickness measurement sample in a thickness direction of the thickness measurement sample, and the second transmitted terahertz wave, which is acquired without transmitting the thickness measurement sample, in addition to the second-time difference information, and to acquire refractive index information of the thickness measurement sample.

The receiving terahertz wave may be stored in the medium to receive terahertz waves at a predetermined sampling rate. In addition, the receiving terahertz wave may be stored in the medium to interpolate a terahertz wave, which is distorted due to the sampling rate, among the received terahertz waves.

Here, it is to be understood that each steps of the thickness measuring method according to one embodiment of the present invention may be performed by a single processing unit or may be performed by a plurality of processing units.

Hereinafter, specific experimental results of the thickness measurement interpolation according to the embodiment will be described.

Experimental Example 1

For EMC 0.30 T, time delays (ps) of the transmission mode and the reflection mode were measured using the thickness measuring device according to the embodiment, and refractive indices were acquired. In order to improve the consistency of the refractive indices, repeated measurements were performed five times, and interpolation was performed for each repetition. The results of Experimental Example 1 are summarized in Table 1 below.

TABLE 1

|  | 1st time | 2nd time | 3rd time | 4th time | 5th time | Average |
|---|---|---|---|---|---|---|
| Transmission mode (interpolation X) | 0.8838 | 0.8838 | 0.8838 | 0.8838 | 0.8838 | 0.8838 |
| Transmission mode (interpolation O) | 0.9015 | 0.9029 | 0.9013 | 0.9041 | 0.9002 | 0.9020 |
| Reflection mode (interpolation X) | 3.7562 | 3.7010 | 3.7010 | 3.7562 | 3.7010 | 3.7230 |
| Reflection mode (interpolation O) | 3.7125 | 3.7139 | 3.7135 | 3.7356 | 3.7141 | 3.7179 |

Based on an average value that is confirmed in Table 1 above, the refractive index of EMC 0.30 T was confirmed to be 1.9040 when the interpolation was not performed, and the refractive index of EMC 0.30 T was confirmed to be 1.9426 when the interpolation was performed.

Experimental Example 2

For EMC 0.45 T, time delays (ps) of the transmission mode and the reflection mode were measured using the thickness measuring device according to the embodiment, and refractive indices were acquired. In order to improve the consistency of the refractive indices, repeated measurements were performed five times, and interpolation was performed for each repetition. The results of Experimental Example 2 are summarized in Table 2 below.

TABLE 2

| | 1st time | 2nd time | 3rd time | 4th time | 5th time | Average |
|---|---|---|---|---|---|---|
| Transmission mode (interpolation X) | 1.3257 | 1.3257 | 1.3809 | 1.3257 | 1.3257 | 1.3368 |
| Transmission mode (interpolation ○) | 1.356 | 1.3738 | 1.3786 | 1.3737 | 1.3727 | 1.3749 |
| Reflection mode (interpolation X) | 5.6895 | 5.6895 | 5.6895 | 5.6895 | 5.6895 | 5.6895 |
| Reflection mode (interpolation ○) | 5.6945 | 5.6701 | 5.6720 | 5.7043 | 5.6703 | 5.6822 |

Based on an average value that is confirmed in Table 2 above, the refractive index of EMC 0.45 T was confirmed to be 1.8864 when the interpolation was not performed, and the refractive index of EMC 0.45 T was confirmed to be 1.9377 when the interpolation was performed.

The refractive indices before and after performing the interpolation, which are confirmed through Experimental Example 1 and Experimental Example 2, may be summarized in Table 3 below.

TABLE 3

| | Refractive index |
|---|---|
| 0.30T (interpolation X) | 1.9040 |
| 0.30T (interpolation ○) | 1.9426 |
| 0.45T (interpolation X) | 1.8864 |
| 0.45T (interpolation ○) | 1.9377 |

As can be seen from Table 1 and Table 2, when the interpolation was performed in the transmission mode and the reflection mode, it was confirmed that a change in time delay occurred in comparison with the case in which the interpolation was not performed. Accordingly, as can be seen in Table 3, when the refractive index before performing the interpolation and the refractive index after performing the interpolation are compared, it is confirmed that an error of about 3.7% is generated. In other words, when measuring a refractive index of an EMC mold, it can be seen that a more accurate refractive index may be acquired by performing the interpolation.

Experimental Example 3

The thicknesses of EMC 0.30 T were calculated with the refractive index before performing the interpolation and the refractive index after performing the interpolation, which were obtained in Experimental Example 1, and the thicknesses acquired through the terahertz wave were compared with actual thicknesses. The actual thicknesses of EMC 0.30 T were measured by X-section. In addition, in order to more accurately compare the thicknesses acquired through the terahertz wave of EMC 0.30 T with the actual thicknesses, five random spots on a left side of EMC 0.30 T, five random spots at a center of EMC 0.30 T, and five random spots on a right side of EMC 0.30 T were extracted, and the respective thicknesses were compared. The results of Experimental Example 3 are summarized in Table 4 below.

TABLE 4

| Point | Location | Actual thickness (μm) | Refractive Index (interpolation X) = 1.9039 Thickness by terahertz wave (interpolation X, μm) | Error (μm) | Refractive Index (interpolation ○) = 1.9426 Thickness by terahertz wave (interpolation ○, μm) | Error (μm) |
|---|---|---|---|---|---|---|
| 1 | Left | 292.6 | 295.72 | 3.12 | 289.30 | 3.30 |
| 2 | | 292.6 | 297.46 | 4.86 | 291.08 | 1.52 |
| 3 | | 290.2 | 294.85 | 4.65 | 289.02 | 1.18 |
| 4 | | 290.2 | 296.59 | 6.39 | 290.51 | 0.31 |
| 5 | | 291.4 | 296.59 | 5.19 | 291.41 | 0.01 |
| 1 | Center | 286.7 | 293.11 | 6.41 | 287.01 | 0.31 |
| 2 | | 288.5 | 296.59 | 8.09 | 290.31 | 1.81 |
| 3 | | 287.3 | 291.37 | 4.07 | 285.10 | 2.20 |
| 4 | | 287.3 | 295.72 | 8.42 | 289.93 | 2.63 |
| 5 | | 286.7 | 294.85 | 8.15 | 289.52 | 2.82 |
| 1 | Right | 283.8 | 286.15 | 2.35 | 281.77 | 2.03 |
| 2 | | 288.5 | 290.5 | 2 | 285.82 | 2.68 |
| 3 | | 289.1 | 292.24 | 3.14 | 285.75 | 3.35 |
| 4 | | 286.2 | 292.24 | 6.04 | 286.86 | 0.66 |
| 5 | | 287.9 | 295.72 | 7.82 | 289.11 | 1.21 |

The averages of the values measured in Table 4 are summarized in Table 5 below.

TABLE 5

| Point | Location | Actual thickness (μm) | Refractive Index (interpolation X) = 1.9039 Thickness by terahertz wave (interpolation X, μm) | Error (μm) | Refractive Index (interpolation ○) = 1.9426 Thickness by terahertz wave (interpolation ○, μm) | Error (μm) |
|---|---|---|---|---|---|---|
| Average | Left | 291.4 | 296.24 | 4.84 | 290.26 | 1.26 |
| | Center | 287.3 | 264.33 | 7.03 | 288.37 | 1.95 |
| | Right | 287.1 | 291.37 | 4.27 | 285.86 | 1.99 |
| | Total | 288.6 | 293.98 | 5.38 | 288.17 | 1.73 |

Experimental Example 4

The thicknesses of EMC 0.45 T were calculated with the refractive index before performing the interpolation and the refractive index after performing the interpolation, which were obtained in Experimental Example 2, and the thicknesses acquired through the terahertz wave were compared with actual thicknesses. The actual thicknesses of EMC 0.45 T were measured by X-section. In addition, in order to more accurately compare the thicknesses acquired through the terahertz wave of EMC 0.45 T with the actual thicknesses, five random spots on a left side of EMC 0.45 T, five random spots at a center of EMC 0.45 T, and five random spots on a right side of EMC 0.45 T were extracted, and the respective thicknesses were compared. The results of Experimental Example 4 are summarized in Table 6 below.

TABLE 6

| Point | Location | Actual thickness (μm) | Terahertz wave thickness (interpolation X, μm) Refractive Index (interpolation X) = 1.8864 | Error (μm) | Thickness by terahertz wave (interpolation ○, μm) Refractive Index (interpolation ○) = 1.9377 | Error (μm) |
|---|---|---|---|---|---|---|
| 1 | Left | 443.9 | 452.96 | 9.06 | 441.93 | 1.97 |
| 2 | | 445.9 | 457.36 | 11.46 | 445.92 | 0.02 |
| 3 | | 442 | 454.72 | 12.72 | 443.75 | 1.75 |
| 4 | | 449.7 | 459.99 | 10.29 | 447.16 | 2.54 |
| 5 | | 448.8 | 458.23 | 9.43 | 445.82 | 2.98 |
| 1 | Center | 441 | 453.84 | 12.84 | 441.49 | 0.49 |
| 2 | | 445.9 | 457.35 | 11.45 | 444.91 | 0.99 |
| 3 | | 443.9 | 452.96 | 9.06 | 440.72 | 3.18 |
| 4 | | 443.9 | 458.23 | 14.33 | 445.94 | 2.04 |
| 5 | | 443.9 | 455.6 | 10.7 | 444.82 | 0.08 |
| 1 | Right | — | — | — | — | — |
| 2 | | 443.9 | 452.96 | 9.06 | 440.35 | 3.55 |
| 3 | | 442.9 | 450.33 | 7.43 | 440.28 | 2.62 |
| 4 | | 442.9 | 458.23 | 15.33 | 445.31 | 2.41 |
| 5 | | 446.8 | 454.72 | 7.92 | 442.16 | 4.64 |

The averages of the values measured in Table 6 are summarized in Table 7 below.

TABLE 7

| Point | Location | Actual thickness (μm) | Thickness by terahertz wave (interpolation X, μm) Refractive Index (interpolation X) = 1.9039 | Error (μm) | Thickness by terahertz wave (interpolation ○, μm) Refractive Index (interpolation ○) = 1.9426 | Error (μm) |
|---|---|---|---|---|---|---|
| Average | Left | 446.1 | 456.65 | 10.59 | 444.91 | 1.85 |
| | Center | 443.9 | 455.60 | 11.68 | 443.57 | 1.36 |
| | Right | 444.1 | 454.06 | 9.94 | 442.03 | 3.30 |
| | Total | 444.7 | 455.53 | 10.79 | 443.61 | 2.09 |

As can be seen from Table 5 and Table 7, it was confirmed that, in Example 3, for EMC 0.30 T, the error of the total average thickness before performing the interpolation was 5.38 μm, but the error of the total average thickness after performing the interpolation was reduced to 1.73 μm. In addition, it was confirmed that in Example 4, for EMC 0.45 T, the error of the total average thickness before performing the interpolation was 10.79 μm, but the error of the total average thickness after performing the interpolation was reduced to 2.09.

Accordingly, when measuring the thickness of the EMC mold, it can be seen that a more accurate thickness may be acquired by performing the interpolation. In addition, it can be seen that when the thickness of the EMC mold is measured using the thickness measuring device according to the embodiment of the present invention, the difference from the actual thickness of the EMC mold is very small.

According to one embodiment of the present invention described above, the refractive index information of the thickness measurement sample may be acquired, and the thickness information may be acquired based on the acquired refractive index information. In other words, since the refractive index information and the thickness information may be acquired together, the usability may be improved. In particular, when the thickness measurement sample is an EMC mold, a refractive index of the EMC mold may vary depending on the ratio of the composition. That is, it is necessary to measure the refractive index of the EMC mold each time. In relation to this, according to one embodiment of the present invention, the refractive index and the thickness may be measured together in an in-line manner so that a separate refractive index measurement process may be omitted, thereby improving the usability.

Furthermore, according to one embodiment of the present invention, an error accompanying the sampling rate may be minimized so that an accuracy of the thickness measurement may be improved. In addition, two performance Indices, which are error reduction and data processing efficiency, may be achieved by distinguishing the reflection mode from the transmission mode and putting more resources for error reduction into the transmission mode in which the risk of error is relatively high.

Although the present invention has been described in detail using the exemplary embodiments, the scope of the present invention is not limited to the specific embodiments and should be construed in accordance with the appended claims. In addition, those skilled in the art should understand that many modifications and variations can be made without departing from the scope of the present invention.

INDUSTRIAL APPLICABILITY

A thickness measuring device, a thickness measuring method, and a thickness measuring program according to the embodiment of the present invention may be used where a thickness measurement of a micro-precision part such as a semiconductor is required.

The invention claimed is:
1. A thickness measuring device comprising:
   a terahertz wave signal processing unit configured to receive a first reflected terahertz wave, which passes through a surface of a thickness measurement sample and is reflected from a rear surface of the thickness measurement sample, and a second reflected terahertz wave that is reflected from the surface of the thickness measurement sample;
   a refractive index information acquisition unit configured to acquire a refractive index information of the thickness measurement sample in consideration of second-time difference information between the first reflected terahertz wave and the second reflected terahertz wave; and
   a thickness information acquisition unit configured to acquire a thickness information of the thickness measurement sample in consideration of the refractive index information,
   wherein the refractive index information acquisition unit acquires the refractive index information of the thickness measurement sample by further considering first-time difference information between a first transmitted terahertz wave, which transmits the thickness measurement sample in a thickness direction of the thickness measurement sample, and a second transmitted terahertz wave, which is acquired without transmitting the thickness measurement sample, in addition to the second-time difference information.
2. The thickness measuring device of claim 1, wherein the terahertz wave signal processing unit further receives the first transmitted terahertz wave and the second transmitted terahertz wave.

3. The thickness measuring device of claim 2, wherein
the terahertz wave signal processing unit receives the first transmitted terahertz wave and the second transmitted terahertz wave at a predetermined sampling rate, and
the terahertz wave signal processing unit interpolates a terahertz wave, which is distorted due to the sampling rate, among the first transmitted terahertz wave and the second transmitted terahertz wave.

4. The thickness measuring device of claim 1, wherein
the terahertz wave signal processing unit receives the first reflected terahertz wave and the second reflected terahertz wave at a predetermined sampling rate, and
the terahertz wave signal processing unit interpolates a terahertz wave, which is distorted due to the sampling rate, among the first reflected terahertz wave and the second reflected terahertz wave.

5. The thickness measuring device of claim 3, wherein
the terahertz wave signal processing unit selectively interpolates a specific terahertz wave whose left and right symmetry is distorted around a peak point among the received terahertz waves.

6. The thickness measuring device of claim 2, wherein
the terahertz wave signal processing unit performs in a transmission mode, in which the first and second transmitted terahertz waves forming a pair are repeatedly received a predetermined number of times, and in a reflection mode in which the first and second reflected terahertz waves forming a pair are repeatedly received a predetermined number of times, and
the predetermined number of times in the transmission mode is greater than the predetermined number of times in the reflection mode.

7. The thickness measuring device of claim 1, wherein
the refractive index information acquisition unit uses $$n = \frac{1}{1 - 2 \cdot \frac{\Delta td_1}{\Delta td_2}}$$

as an equation
for calculating the refractive index of the thickness measurement sample
(n: refractive index, $\Delta td_1$: time difference between the first transmitted terahertz wave and the second transmitted terahertz wave $\Delta td_2$: time difference between the first reflected terahertz wave and the second reflected terahertz wave).

8. The thickness measuring device of claim 7, wherein
the thickness information acquisition unit uses $$d_E = C \cdot \frac{\Delta td_2}{2 \cdot n}$$

as an equation for
calculating the thickness of the thickness measurement sample, sample
($d_E$: thickness of the thickness measurement sample, C: speed of light in the air).

9. A thickness measuring method comprising:
receiving a terahertz wave configured to receive a first reflected terahertz wave, which passes through a surface of a thickness measurement sample and is reflected from a rear surface of the thickness measurement sample, and a second reflected terahertz wave that is reflected from the surface of the thickness measurement sample;
calculating a refractive index configured to acquire a refractive index information of the thickness measurement sample in consideration of second-time difference information between the first and second reflected terahertz waves; and
calculating a thickness configured to acquire a thickness information of the thickness measurement sample in consideration of the refractive index information,
wherein the calculating the refractive index calculation, first-time difference information between a first transmitted terahertz wave, which transmits the thickness measurement sample in a thickness direction of the thickness measurement sample, and a second transmitted terahertz wave, which is acquired without transmitting the thickness measurement sample, is further considered in addition to the second-time difference information to acquire refractive index information of the thickness measurement sample.

10. The thickness measuring method of claim 9, wherein
the receiving a terahertz wave further comprises a receiving the first transmitted terahertz wave and the second transmitted terahertz wave.

11. The thickness measuring method of claim 9, wherein
the receiving a terahertz wave further comprises receiving the first transmitted terahertz wave and the second transmitted terahertz wave at a predetermined sampling rate, and interpolating a terahertz wave, which is distorted due to the sampling rate, among the first transmitted terahertz wave and the second transmitted terahertz wave.

12. The thickness measuring method of claim 11, wherein
the receiving a terahertz wave further comprises a selectively interpolating a specific terahertz wave whose left and right symmetry is distorted around a peak point among the received terahertz waves.

13. The thickness measuring method of claim 9, wherein
the receiving a terahertz wave further comprises receiving the first reflected terahertz wave and the second reflected terahertz wave at a predetermined sampling rate, and interpolating a terahertz wave, which is distorted due to the sampling rate, among the first reflected terahertz wave and the second reflected terahertz wave.

14. The thickness measuring method of claim 9, wherein
in the receiving a terahertz wave, a transmission mode which the first and second transmitted terahertz waves forming a pair are repeatedly received a predetermined number of times, and a reflection mode which the first and second reflected terahertz waves forming a pair are repeatedly received a predetermined number of times, are performed, and
the predetermined number of times in the transmission mode is greater than the predetermined number of times in the reflection mode.

15. The thickness measuring method of claim 9, wherein
in the calculating the refractive index $$n = \frac{1}{1 - 2 \cdot \frac{\Delta td_1}{\Delta td_2}}$$

is used as an equation for
calculating a refractive index of the thickness measurement sample (n: refractive index, $\Delta td_1$: time difference between the first transmitted terahertz wave and the second transmitted terahertz wave, $\Delta td_2$: time difference between the first reflected terahertz wave and the second reflected terahertz wave).

16. The thickness measuring method of claim 15, wherein in the calculating the thickness, $$d_E = C \cdot \frac{\Delta td_2}{2 \cdot n}$$

is used as an equation for calculating a thickness of the thickness measurement sample $d_E$ thickness of the thickness measurement sample, C: speed of light in the air).

17. A non-transitory storage medium having a thickness measuring program stored thereon to execute:
receiving terahertz wave configured to receive a first reflected terahertz wave, which passes through a surface of a thickness measurement sample and is reflected from a rear surface of the thickness measurement sample, and a second reflected terahertz wave that is reflected from the surface of the thickness measurement sample by a terahertz wave signal processing unit;
calculating a refractive index configured to acquire a refractive index information of the thickness measurement sample in consideration of second-time difference information between the first and second reflected terahertz waves by a refractive index information acquisition unit; and
calculating a thickness configured acquire a thickness information of the thickness measurement sample in consideration of the refractive index information by a thickness information acquisition unit,
wherein the calculating the refractive index further comprises further considering first-time difference information between a first transmitted terahertz wave, which transmits the thickness measurement sample in a thickness direction of the thickness measurement sample, and a second transmitted terahertz wave, which is acquired without transmitting the thickness measurement sample in addition to the second-time difference information.

* * * * *